US012168522B2

(12) United States Patent
Soto Carril (10) Patent No.: US 12,168,522 B2
(45) Date of Patent: Dec. 17, 2024

(54) AUXILIARY POWER UNIT SYSTEM OF AN AIRCRAFT

(71) Applicant: Airbus Operations S.L.U., Getafe (ES)

(72) Inventor: Miguel Ángel Soto Carril, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 54 days.

(21) Appl. No.: 18/311,331

(22) Filed: May 3, 2023

(65) Prior Publication Data

US 2023/0382553 A1 Nov. 30, 2023

(30) Foreign Application Priority Data

May 27, 2022 (EP) .................................. 22382511.8

(51) Int. Cl.
*B64D 41/00* (2006.01)
*F03D 9/25* (2016.01)
*F03D 80/60* (2016.01)

(52) U.S. Cl.
CPC ............... *B64D 41/00* (2013.01); *F03D 9/25* (2016.05); *F03D 80/60* (2016.05); *B64D 2041/002* (2013.01); *F05B 2220/10* (2013.01); *F05B 2220/31* (2013.01); *F05B 2220/50* (2013.01); *F05B 2220/706* (2013.01); *F05B 2260/20* (2013.01)

(58) Field of Classification Search
CPC ..... B64D 41/00; B64D 2041/002; F03D 9/25; F03D 80/60; F05B 2220/31; F05B 2220/50
See application file for complete search history.

(56) References Cited

U.S. PATENT DOCUMENTS

| 6,264,137 | B1 | 7/2001 | Sheoran |
| 6,651,929 | B2 * | 11/2003 | Dionne ..................... F02C 7/14 |
| | | | 165/44 |
| 8,967,530 | B2 * | 3/2015 | Gatzke ..................... F03D 9/32 |
| | | | 244/58 |
| 2012/0006938 | A1 | 1/2012 | Gatzke |
| 2012/0312023 | A1 | 12/2012 | Ertz et al. |
| 2020/0130858 | A1 | 4/2020 | Julien et al. |

FOREIGN PATENT DOCUMENTS

EP 3647205 A1 5/2020

OTHER PUBLICATIONS

European Search Report for European Patent Application No. 22382511.8 dated Oct. 21, 2022; priority document.

* cited by examiner

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

An auxiliary power unit system of an aircraft includes an auxiliary power unit (APU), a cooling unit for the APU including a heat exchanger, an air inlet in communication with the APU and/or with the cooling unit, an air inlet door unit located at the air inlet, a first duct configured to draw air into the APU and having an entrance in communication with the air inlet, a second duct having an entrance in communication with the air inlet, the heat exchanger being at least partially located within the second duct, an air turbine located within the second duct downstream of the heat exchanger, and an electrical generator coupled to the air turbine.

15 Claims, 5 Drawing Sheets

AUXILIARY POWER UNIT SYSTEM OF AN AIRCRAFT

CROSS-REFERENCES TO RELATED APPLICATIONS

This application claims the benefit of the European patent application No. 22382511.8 filed on May 27, 2022, the entire disclosures of which are incorporated herein by way of reference.

FIELD OF THE INVENTION

The present invention relates to an auxiliary power unit (APU) system of an aircraft, to the tail cone of an aircraft comprising the auxiliary power unit (APU) system and to the aircraft comprising the tail cone. The invention relates to the production of electrical energy from residual heat of the auxiliary power unit (APU), the increase in aircraft thrust and the recovery of aircraft drag energy.

BACKGROUND OF THE INVENTION

The auxiliary power unit (APU) is a turbine engine or reciprocating engine usually mounted in the tail cone of an aircraft to provide autonomous electrical and mechanical power for the following purposes:
Starting power for the main engines.
Pneumatic power for cabin air conditioning systems.
shaft power for other pneumatic and hydraulic systems.
Backup electrical and pneumatic power for in-flight operations and emergencies.
Electrical and pneumatic power for ground operations with the engines shut down.

Most medium and large aircraft use turbine engine auxiliary power units (APU). Known auxiliary power units (APU) comprise the auxiliary power unit (APU) engine, an AC electrical generator and engine mount brackets, among other elements.

More specifically, known auxiliary power units (APU) comprise an air inlet that provides air to a compressor of the auxiliary power unit (APU) and cooling air. The air inlet comprises an air diffuser duct, compressors air inlet duct, accessory cooling air duct and an air inlet door.

The elements inside the auxiliary power unit (APU) may have friction between the moving parts and require effective lubrication and cooling, as well as particle sweeping. Heat at these moving parts is the result of:
Heat from hot parts on the engine (like combustion chamber or turbine) transferred by radiation, conduction and/or convection.
Heat released by friction losses, in gears, bushings, bearings.
Windage.
Oil churning.

Cooling of these elements is achieved through a lubricating oil. The lubrication system reduces friction between moving parts, prevents destructive scoring in gears and removes heat generated to keep system temperatures within limits. The lubricating oil is cooled in an air to liquid cooler, i.e., a heat exchanger, usually by ventilation air in the auxiliary power unit (APU) compartment.

The air flow for the auxiliary power unit (APU) compartment ventilation is achieved by either:
Forced ventilation by a fan, coupled to the auxiliary power unit (APU) shaft or independent, and released through the auxiliary power unit (APU) exhaust system or any other opening.
The auxiliary power unit (APU) compressor driving the air to the auxiliary power unit (APU) compartment through an air intake and releasing it to the auxiliary power unit (APU) exhaust through an eductor and afterwards to the ambient air or releasing it to the outside through a different opening.

SUMMARY OF THE INVENTION

As stated in the background of the invention, engine coolers heat and air flow are wasted to the environment and do not contribute to increase the efficiency or energy of the auxiliary power unit (APU) of the aircraft. The present invention relates to an aircraft auxiliary power unit (APU), of the turbine or reciprocating engine type, that provides electrical power and additionally bleed air.

According to the above, the auxiliary power unit system of an aircraft object of the invention comprises:
an auxiliary power unit (APU),
a cooling unit for the auxiliary power unit (APU) comprising at least a heat exchanger,
an air inlet in fluid communication with the auxiliary power unit (APU) and/or with the cooling unit,
an air inlet door unit located at the air inlet configured to open and close the air inlet to allow or prevent an air flow from outside the aircraft from entering the air inlet,
a first duct configured for drawing air into the auxiliary power unit (APU) and having an entrance in fluid communication with the air inlet,
a second duct having an entrance in fluid communication with the air inlet.

The auxiliary power unit system object of the invention further comprises:
the heat exchanger of the cooling unit being at least partially located within the second duct,
an air turbine located within the second duct downstream of the heat exchanger,
an electrical generator coupled to the air turbine so that the air turbine and the electrical generator are configured to convert air flow energy in the second duct into electrical energy.

Therefore, the aim of the invention is to harness the cooling air flow and use it to:
Reduce the parasitic drag caused by air intakes that draw air in the auxiliary power unit (APU) compartment for cooling functions.
Partially compensate drag by using waste heat to offset aerodynamic drag.
The ducted air turbine is also used for emergency power generation and for providing additional drag when required by the aircraft, for instance, landing, descent, and approach, by converting this energy into electrical power, that otherwise will be lost to the ambient environment.

It is also an object of the invention to provide a tail cone of an aircraft comprising an auxiliary power unit system according to the above.

The tail cone is the last fuselage section of the aircraft at its rear part. The invention is not limited to an auxiliary power unit (APU) located in the tail cone of the aircraft, other locations along the aircraft are also possible.

It is also an object of the invention to provide an aircraft comprising a tail cone according to the above.

BRIEF DESCRIPTION OF THE DRAWINGS

To complete the description and to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Referring to the embodiments of the accompanying figures, the main components of the auxiliary power unit and, and a brief description of each, are as follows:

the auxiliary power unit (APU) (1), either a turbine engine or reciprocating engine, the cooling unit comprising a first heat exchanger (2.1) and a second heat exchanger (2.2), the air inlet (3) in fluid communication with the auxiliary power unit (APU) (1) and with the cooling unit (2), the air inlet door unit (4) opening and closing the air inlet (3), the first duct (5) drawing air into the auxiliary power unit (APU) (1) and in fluid communication with the air inlet (3), the second duct (6) having an entrance in fluid communication with the air inlet (3), the first heat exchanger (2.1) and a second heat exchanger (2.2) being located within the second duct (6), the air turbine (7) located in the second duct (6) downstream the first and the second heat exchangers (2.1, 2.2), more specifically the air turbine (7) is a ram air turbine, i.e., a small ducted ram air turbine that is connected to an electrical generator, installed in an aircraft and used as a power source. It generates power from the airstream by ram pressure due to the speed of the aircraft. In the shown embodiment, the air turbine (7) is axial flow.

the air inlet door unit (4).

In the shown embodiments the air inlet door unit (4) is movable between:

a first position, in which it closes the air flow to the first duct and to the second duct, a second position, in which it closes the air flow to the first duct and opens the air flow to the second duct so that the air turbine increases drag of the aircraft and/or the air turbine generates electrical power, and a third position, in which it opens the air flow to the first duct and to the second duct.

According to the above, the shown system has at least three operating positions:

A first position, in which there is no air flow through the first duct (5) and the second duct (6). In this first position the auxiliary power unit (APU) (1) and the air turbine (7) would be OFF.

A second position, in which there is no air flow through the first duct (5) and there is air flow through the second duct (6). In this second position the auxiliary power unit (APU) (1) would be OFF, and the air turbine (7) would be ON.

A third position, in which there is air flowing through the first duct (5) and the second duct (6). In this third position the auxiliary power unit (APU) (1) would be ON, and the air turbine (7) would be ON or OFF.

Figure 1:
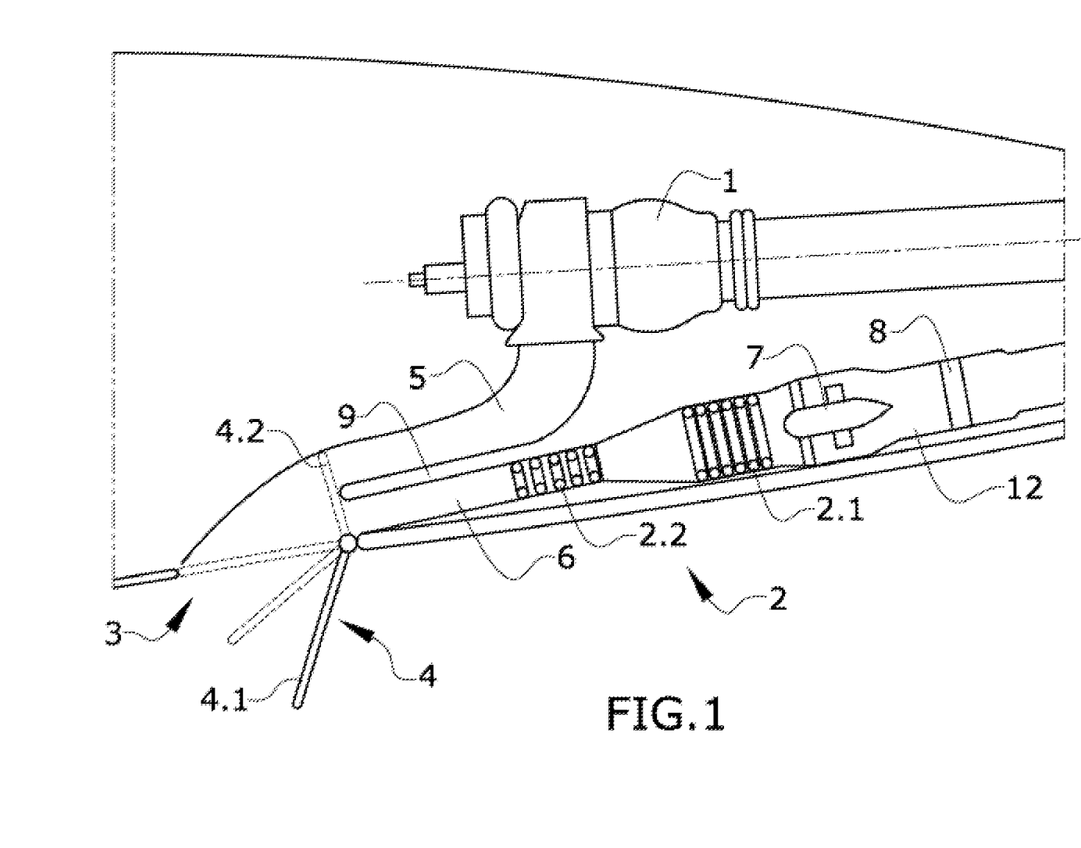
FIG. 1 shows a schematic longitudinal section of a tail cone comprising a first embodiment of the auxiliary power unit system.
Figure 5:
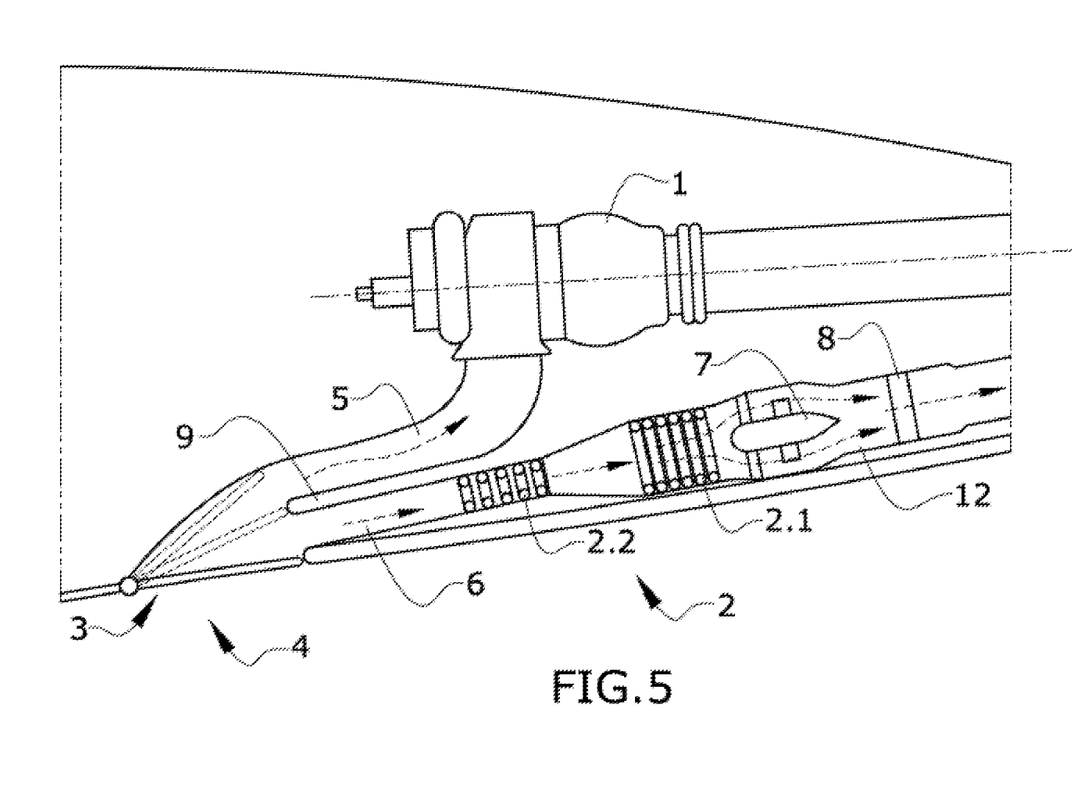
FIG. 5 shows a schematic longitudinal section of a tail cone of an aircraft and an embodiment of the auxiliary power unit (APU) system in three different positions of the air inlet door unit.
Figure 6:
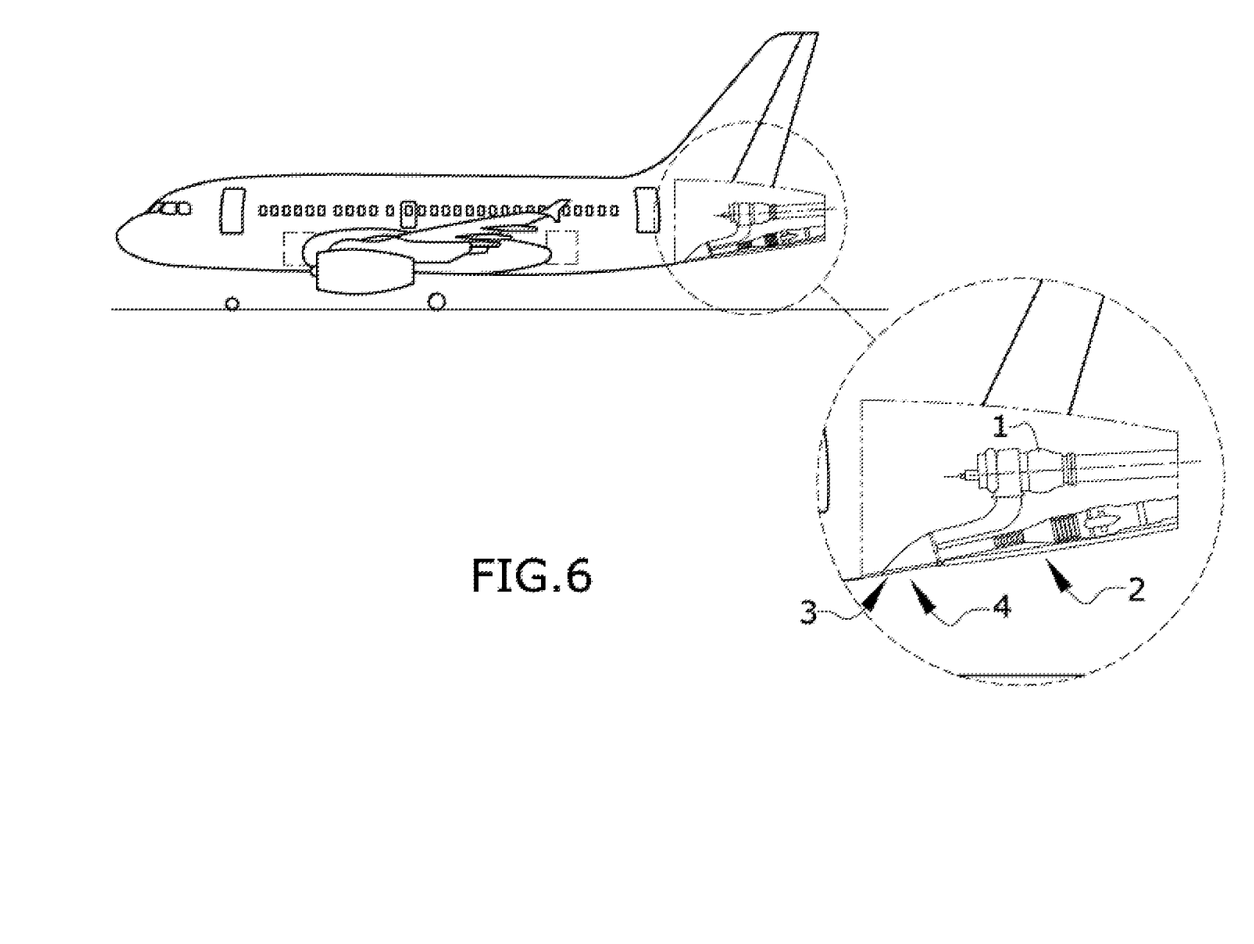
FIG. 6 shows a lateral view of an aircraft having an auxiliary power unit (APU) system at the tail cone of the aircraft.

In the embodiments shown in FIGS. 1 and 5, the auxiliary power unit (APU) (1) is a reciprocating engine. The shown embodiment has lubricant oil and a cooling liquid, like glycol. For this reason, a first heat exchanger (2.1) and a second heat exchanger (2.2) are needed. The first heat exchanger (2.1) is a liquid-air heat exchanger for cooling the cooling liquid and the second heat exchanger (2.2) is a liquid-air heat exchanger for intercooling functions.

In another embodiment, up to three different heat exchangers may be located within the second duct (6) or even a single heat exchanger.

The reciprocating engine may have an additional heat exchanger located on the auxiliary power unit (APU) between a turbo compressor outlet and an engine intake inlet.

In the case of a turbine engine, typically a single heat exchanger would be located within the second duct (6), although there could be more than one heat exchanger.

The heat exchangers (2.1, 2.2) shown in the figures are of the helical tube and shell type, but other heat exchanger types could also be used, like fin and plate. Both heat exchangers (2.1, 2.2) are placed in series along the second duct (6).

In the embodiments shown in FIGS. 1 and 5, the auxiliary power unit (APU) also comprises a fan (8) located in the second duct (6) downstream of the air turbine (7). The required air flow cooling the oil, glycol, and intercooler fluid at a reciprocating engine of an auxiliary power unit (APU) is too high as to be sufficient by just drawing air suctioned by the auxiliary power unit (APU) compressor, therefore a fan (8) or air amplifier would be required to increase the cooling air flow. The fan (8) or air amplifier will be usually OFF during flight and ON during ground auxiliary power unit (APU) system operations. In other embodiments, the fan (8) may also be ON in flight.

If a fan (8) is used it will be driven by an electrical motor. In an embodiment, the fan (8) may have variable pitch blades so that when the fan (8) is OFF, the fan (8) blades are located at a feathered position, i.e., streamlined with the air flow. The fan (8) may have a brake so as to prevent its rotation when it is OFF.

If an air amplifier is used, pressurized air could be supplied to the air amplifier by a compressor driven by the auxiliary power unit (APU) (1) gearbox.

As previously stated, in the shown embodiments, the air inlet door unit (4) is movable between:

the first position in which it closes the air flow to the first duct (5) and to the second duct (6), the second position in which it closes the air flow to the first duct (5) and opens the air flow to the second duct (6) so that the air turbine (7) increases drag of the aircraft and/or the air turbine (7) generates electrical power, and the third position in which it opens the air flow to the first duct (5) and to the second duct (6).

In the embodiment shown in FIGS. 1 to 4, the auxiliary power unit (APU) (1) comprises a main door (4.1) and a secondary door (4.2). The main door (4.1) is configured to open and close the air inlet (3) and the secondary door (4.2) is configured to open and close the entrance of the first duct (5).

The main door (4.1) and the secondary door (4.2) are both hinged to a rear end of the air inlet (3). The rear end is the end of the air inlet (3) closest to the rear part of the aircraft.

The main door (4.1) and the secondary door (4.2) open in a direction opposite to the first and the second ducts (5, 6), i.e., they open towards the outside of the tail cone in the embodiment shown in FIGS. 1 to 4.

A second embodiment is shown in FIG. 5. The air inlet door unit (4) comprises a door (4.3) hinged to a front end of the air inlet (3). The front end of the air inlet (3) is the end of the air inlet (3) closest to the front part of the aircraft.

The free end of the door (4.3) opens towards the first and the second ducts (5, 6), i.e., towards the inside of the tail cone. The free end of the door (4.3) is the end of the door (4.3) opposite to its hinge. The free end is movable between:
a first position, wherein the free end is located at a rear end of the air inlet (3) so as to close the air inlet (3),
a second position, wherein the free end is located at a cross end of the second duct (6) opposite the air inlet (3) so as to open the entrance of the second duct (6), and
a third position, wherein the free end is located at a cross end of the first duct (5) opposite the second duct (6) so as to open the entrances of the first duct (5) and of the second duct (6).

In the shown embodiments, the first duct (5) and the second duct (6) are separated by a partition wall (9) longitudinal to the first and second duct (5, 6) that splits the air flow downstream of the air inlet (3).

Figure 2:
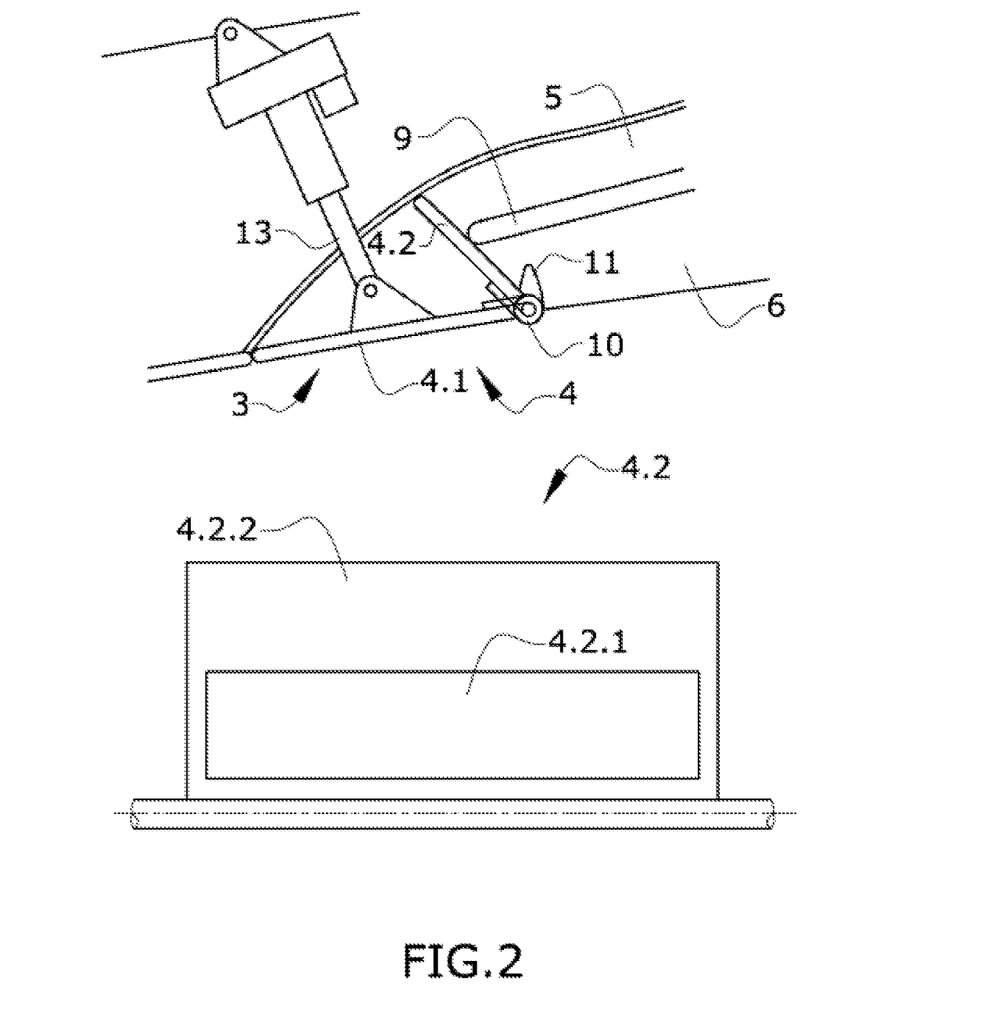
FIG. 2 shows a schematic longitudinal section of an embodiment of an air inlet of a second embodiment of the invention in a first position of the air inlet door unit and a schematic front view of an embodiment of an element of the air inlet door unit.

In both embodiments, in the first position, there is no air flow through the air inlet (3), see for instance FIG. 2. The auxiliary power unit (APU) (1) is not required to be ON, and the aircraft operation does not require additional drag or auxiliary/emergency power generation. This is typical for a cruise flight wherein the auxiliary power unit (APU) (1) could be OFF and thus there is no need to draw air through the heat exchangers (2.1, 2.2).

The air turbine (7) could be OFF since an airflow through the second duct (6) would create a drag penalty for the aircraft and therefore a fuel consumption increase. The closed air inlet door unit (4) keeps an aerodynamic tail cone with no additional penalties on drag caused by air flow through air inlet (3).

In the second position, the air inlet (3) is partially opened in the shown embodiments. In the embodiment shown in FIG. 3, the main door (4.1) leaves the air inlet (3) partially open while the secondary door (4.2) allows air flow into the second duct (6) and prevents air flow into the first duct (5).

Figure 3:
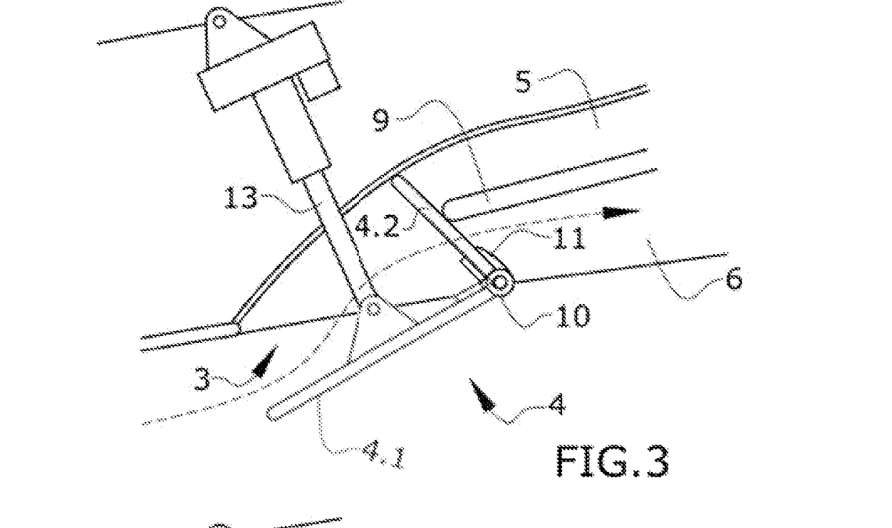
FIG. 3 shows the schematic longitudinal section of the air inlet of the embodiment of FIG. 2 in a second position of the air inlet door unit.
Figure 4:
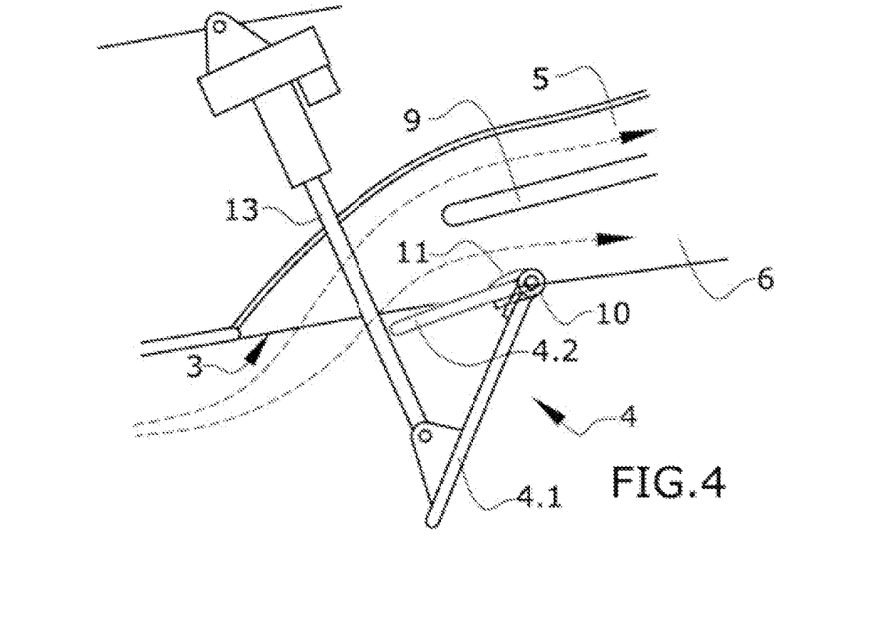
FIG. 4 shows the schematic longitudinal section of the air inlet of the embodiment of FIG. 2 in a third position of the air inlet door unit.

More specifically, the shown embodiment of the secondary door (4.2) disclosed in FIGS. 2 to 4 comprises a first portion (4.2.1), see FIG. 2, adjacent to the hinge comprising an opening adapted to the cross sectional shape of the second duct (6). The secondary door (4.2) comprises a second portion (4.2.2) adjacent to the first portion (4.2.1) adapted to be located against the entrance of the first duct (5) and having no openings. Therefore, when the main door (4.1) is partially opened, the shape of the secondary door (4.2) allows the air flow to go through the second duct (6) but not to the first duct (5).

In the embodiment shown in the figures, the auxiliary power unit system comprises an actuator (13) attached to the main door (4.1) configured to open and close it. It may be an electrical actuator or a hydraulic actuator. In an embodiment, it is joined to the main door (4.1) by a spherical bearing joint and to the aircraft tail cone structure at its other end. It may keep the main door (4.1) at any position between fully closed and fully opened to meet the auxiliary power unit (APU) (1) airflow demand while reducing the aerodynamic to the minimum.

The main door (4.1) and the secondary door (4.2) are rotatably joined and the inlet door unit (4) comprises a torsion spring (10) between the main door (4.1) and the secondary door (4.2) to keep the secondary door (4.2) closing the first duct (5) when the main door (4.1) is in the second position.

The torsion spring (10) pushes the secondary door (4.2) against the entrance of the first duct (5) so that the secondary door (4.2) is kept at its fully closed position while the main door (4.1) is located between the first position and the second position.

Additionally, the main door (4.1) comprises a cam (11) configured to push the secondary door (4.2) in the positions ranging between the second and the third position. The cam (11) starts to push the secondary door (4.2) at the second position and moves the secondary door (4.2) to its fully open position at the third position while at any position between second and third positions the torsion spring (10) holds the secondary door (4.2) against the cam (11). In an embodiment, the cam (11) is attached to the main door (4.1) at both lateral sides of the main door (4.1).

Therefore, the secondary door (4.2) stays closed until the main door (4.1) rotates beyond the second position, namely while running from the second position to the third position, the secondary door (4.2) opens and arrives at the fully open position, see FIG. 3, when the main door (4.1) is at the fully open third position.

In FIG. 5 the door (4.3) is hinged to a front end of the air inlet (3) and its free end moves from the rear end of the air inlet (3) so as to close the air inlet (3) to a cross end of the second duct (6) opposite the air inlet (3) so as to open the entrance of the second duct (6) but still closing the entrance to the first duct (5).

In the second position, therefore there is no air flow through the first duct (5), i.e., to the auxiliary power unit (APU), but there is air flow in the second duct (6). Heat exchangers (2.1, 2.2) are not working, but the air turbine (7) may be ON.

This is applicable for descent and initial approach as well as final approach and landing phases, where the auxiliary power unit (APU) (1) is not required to be ON, but the air turbine (7) helps to provide additional drag to slow down the aircraft and convert the otherwise wasted energy into useful electrical energy by means of the generator coupled to the air turbine (7). This position is also used for emergency power generation. The electrical energy could be stored for instance by supercapacitors or high charge/discharge rate batteries or used while the air turbine (7) is ON.

In an embodiment, the air turbine (7) is coupled to an alternator that provides electrical energy to the aircraft, it could be stored by supercapacitors, at high charge/discharge rate batteries or feed the aircraft electrical system for instant power use.

FIGS. 1, 4 and 5 disclose embodiments of the third position of the air inlet door unit (4).

In the embodiment shown in FIG. 4, when the main door (4.1) is in the third position, the secondary door (4.2) is open, the auxiliary power unit (APU) (1) is ON, air flows through the first duct (5) and the second duct (6), heat exchangers (2.1, 2.2) are working.

In the shown embodiments, the second duct (6) comprises a convergent exhaust (12) to the atmosphere downstream the air turbine (7). Therefore, the walls of the second duct (6) tend to approach each other.

In an embodiment, the air turbine (7) comprises variable pitch blades. It allows to trim the pitch at any desired angle and also at least to put the blades in the feathered position, i.e., streamlined with the air flow.

Near the rotor blades and upstream, the guide vanes have an aerodynamic and structural function to support the turbine and generator assembly. The guide vanes serve two functions:

Structural elements to support the turbine and generator on the second duct (6), in turn the second duct (6) is attached to the tail cone.

Providing the necessary component in the airflow prior to entry into the turbine rotor.

Two different scenarios are distinguished in the third position:

The air turbine (7) is OFF, and the blades pitch is at the proper angle at the feather position, i.e., streamlined with the air flow. Therefore, it is a low drag position, and the air turbine (7) is at zero or close to zero revolutions. The aircraft does not require additional drag or emergency power generation and therefore the turbine blades are feathered, to reduce the otherwise drag penalty of the air turbine (7).

In the shown embodiments, the second duct (6) comprises a divergent section located upstream the heat exchanger (2.1, 2.2) which is closest to the entrance of the second duct (6) that increases the pressure and reduces the air velocity. Divergent means that the walls of the second duct (6) tend to separate from each other.

In the shown embodiments, the second duct (6) has a longitudinal axis having a component parallel to a longitudinal axis of the aircraft. In an embodiment, the longitudinal axis of the second duct (6) is nearly parallel to the longitudinal axis of the aircraft. The longitudinal axis runs from the nose of the aircraft to the tail. Additionally, second duct (6) bends have to be kept to the minimum in order to increase the thrust effect.

In the shown embodiment, the second duct (6) is located closer to the air inlet (3) in a transversal direction than the first duct (5), thus the second duct (6) is located at the bottom of the tail cone or what is the same the second duct (6) is located in a more external position than the first duct (5) in the auxiliary power unit system, i.e., in the fuselage of the aircraft.

The second duct (6) could be located at the upper part of the tail cone also, the air inlet (3), the air inlet door unit (4) and the second duct (6) being located at the top of the tail cone and discharging to the atmosphere at the upper part of the tail cone endcap.

The airflow through the heat exchangers (2.1, 2.2) cools the lubricating oil, glycol, and liquid of the intercooling system. The air is heated while passing across the heat exchangers (2.1, 2.2), then passes through the air turbine (7) with zero or near zero energy transfer and then is exhausted to the atmosphere at a rear opening of second duct (6). The energy transferred to the air flow on the heat exchangers (2.1, 2.2) provides some thrust while is discharged to the atmosphere, this is achieved by:

The divergent intake and the air inlet indoor unit (4) with increased pressure recovery and efficient static pressure rise.

Air is heated in the heat exchangers section.

The convergent exhaust (12).

The above meets the features of a Brayton cycle that leads to a thrust that may offset the aerodynamic drag of the heat exchangers (2.1, 2.2) and the drag of the complete second duct (6) from inlet to outlet.

The air turbine (7) is ON. It is useful for descent, initial approach, as well as final approach and landing phases when the auxiliary power unit (APU) (1) is ON, and the additional drag caused by the air turbine (7) helps to slow down the aircraft. It is also used for emergency power generation.

In this embodiment, the air turbine (7) is ON, the blades are not feathered and are located at the proper pitch angle. The heated air after the heat exchangers (2.1, 2.2) provides a slight increase in power by the air turbine (7), drag is increased and electrical energy is generated at the air turbine (7) generator.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An auxiliary power unit system of an aircraft comprising:
   an auxiliary power unit (APU),
   a cooling unit for the APU comprising at least one heat exchanger,
   an air inlet in fluid communication with at least one of the APU or with the cooling unit,
   an air inlet door unit located at the air inlet to allow an air flow from outside the aircraft to enter the air inlet,
   a first duct configured to draw air into the APU and having an entrance in fluid communication with the air inlet,
   a second duct having an entrance in fluid communication with the air inlet,
   the heat exchanger being at least partially located within the second duct,
   an air turbine located within the second duct downstream the heat exchanger, and
   an electrical generator coupled to the air turbine so that the air turbine and the electrical generator are configured to convert energy of an air flow in the second duct into electrical energy.

2. The auxiliary power unit system of an aircraft, according to claim 1, wherein the air inlet door unit is movable between:
   a first position, in which it is configured to close the air flow to the first duct and to the second duct,
   a second position, in which it is configured to close the air flow to the first duct, and it is configured to open the air flow to the second duct so that at least one of the air turbine increases drag of the aircraft or the air turbine generates electrical power, and
   a third position in which it is configured to open the air flow to the first duct and to the second duct.

3. The auxiliary power unit system of an aircraft, according to claim 2, wherein the air inlet door unit comprises a main door and a secondary door, each door being attached with a hinge to a rear end of the air inlet, the main door configured to open and close the air inlet and the secondary door configured to open and close the entrance of the first duct.

4. The auxiliary power unit system of an aircraft, according to claim 3, wherein the secondary door comprises a first portion adjacent to the hinge comprising an opening adapted to a cross shape of the second duct and a second portion adjacent to the first portion and adapted to be located against the entrance of the first duct and having no openings.

5. The auxiliary power unit system of an aircraft, according to claim 3, wherein the main door and the secondary door are rotatably joined and the inlet door unit also comprises a torsion spring extending between the main door and the secondary door, so as to keep the secondary door closing the first duct when the main door is in the second position.

6. The auxiliary power unit system of an aircraft, according to claim 3, wherein the main door comprises a cam configured to push the secondary door between the second and the third positions.

7. The auxiliary power unit system of an aircraft, according to claim 1, wherein the air turbine comprises variable pitch blades such that a pitch of the blades may be streamlined with the air flow.

8. The auxiliary power unit system of an aircraft, according to claim 1, wherein the second duct comprises a convergent exhaust located downstream of the air turbine.

9. The auxiliary power unit system of an aircraft, according to claim 1, wherein the second duct comprises a divergent section upstream of the heat exchanger closest to the entrance of the second duct.

10. The auxiliary power unit system of an aircraft, according to claim 1, wherein the second duct is located in a more external position than the first duct in the auxiliary power unit system.

11. The auxiliary power unit system of an aircraft, according to claim 1, wherein the cooling unit comprises a first heat exchanger and a second heat exchanger located upstream of the first exchanger within the second duct.

12. The auxiliary power unit system of an aircraft, according to claim 1, wherein the air inlet door unit comprises a door hinged to a front end of the air inlet, the door having a free end configured to open towards the first and the second ducts, the door being movable between:
 a first position, wherein the free end is located at a rear end of the air inlet so as to close the air inlet,
 a second position, wherein the free end is located at a cross end of the second duct opposite the air inlet so as to open the entrance of the second duct, and
 a third position, wherein the free end is located at a cross end of the first duct opposite the second duct so as to open the entrances of the first duct and of the second duct.

13. The auxiliary power unit system of an aircraft, according to claim 1, wherein the first duct and the second duct are separated by a partition wall longitudinal to the first and second duct and configured to split the air flow downstream the air inlet.

14. A tail cone of an aircraft, comprising an auxiliary power unit system according to claim 1.

15. An aircraft comprising a tail cone according to claim 14.

* * * * *